US009550456B2

(12) United States Patent
Lang et al.

(10) Patent No.: US 9,550,456 B2
(45) Date of Patent: Jan. 24, 2017

(54) ARRANGEMENT FOR ADJUSTING A REAR VIEW MIRROR FOR COMMERCIAL VEHICLES

(71) Applicant: Mekra Lang GmbH & Co. KG, Ergersheim (DE)

(72) Inventors: Werner Lang, Ergersheim (DE); Sebastian Heger, Bad Windsheim (DE); Willi Felbinger, Markt Nordheim (DE); Albrecht Popp, Weihenzell (DE)

(73) Assignee: Mekra Lang GmbH & Co. KG, Ergersheim (DE)

( * ) Notice: Subject to any disclaimer, the term of this patent is extended or adjusted under 35 U.S.C. 154(b) by 0 days.

(21) Appl. No.: 14/640,010

(22) Filed: Mar. 5, 2015

(65) Prior Publication Data

US 2015/0251601 A1     Sep. 10, 2015

(30) Foreign Application Priority Data

Mar. 7, 2014 (DE) ......................... 10 2014 204 275

(51) Int. Cl.
*B60R 1/06* (2006.01)

(52) U.S. Cl.
CPC ............... *B60R 1/0602* (2013.01); *B60R 1/06* (2013.01); *B60R 2300/8053* (2013.01)

(58) Field of Classification Search
CPC .......... B60R 1/006; B60R 1/06; B60R 1/0617; B60R 1/074; B60R 1/025; B60R 1/08; B60R 1/10; B60R 1/072; B60R 1/0602; G02B 7/1822; G02B 7/198; G02B 7/1824; G02B 7/1827
See application file for complete search history.

(56) References Cited

U.S. PATENT DOCUMENTS 2,664,029 A    12/1953  Higgins
4,444,466 A     4/1984  Deshaw ..................... 350/289
(Continued)

FOREIGN PATENT DOCUMENTS

DE         915538 B       10/1952
DE      19803459 A1        1/1998
EP       2195195 B1       12/2008

OTHER PUBLICATIONS

Extended European Search Report dated Jul. 7, 2015, from the European Patent Office in the related European application EP15157251.8.
(Continued)

*Primary Examiner* — Jennifer L. Doak
(74) *Attorney, Agent, or Firm* — Imperium Patent Works; Darien K. Wallace

(57) ABSTRACT

A device for adjusting rear view mirrors includes a vehicle-side first element and a movable second element. A reflecting surface is attached to the second element. One of the first or second elements has a concave surface, and the other element has a convex surface. The second element pivots about at least one axis that is fixed with respect to the first element. A joining slot is formed where the convex surface slides over the concave surface. One of the elements has a sealing lip that makes sliding contact with the other element and prevents foreign objects from entering the slot between the convex surface and the concave surface. The sealing lip annularly contacts either the convex surface or the concave surface. Alternatively, the concave surface is formed by a spherical shell, and the sealing lip slides over a second convex surface disposed on the shell opposite the concave surface.

20 Claims, 4 Drawing Sheets

(56) References Cited

U.S. PATENT DOCUMENTS

| | | | |
|---|---|---|---|
| 4,979,810 A | 12/1990 | Ogasawara | 350/633 |
| 2003/0077114 A1 | 4/2003 | Broeker et al. | 403/135 |
| 2008/0043354 A1* | 2/2008 | Fukai | B60R 1/072 |
| | | | 359/877 |

OTHER PUBLICATIONS

Search report dated Oct. 16, 2014, from the German Patent Office in the related foreign application DE102014204275.5.

* cited by examiner

ARRANGEMENT FOR ADJUSTING A REAR VIEW MIRROR FOR COMMERCIAL VEHICLES

CROSS REFERENCE TO RELATED APPLICATION

This application is based on and hereby claims the benefit under 35 U.S.C. §119 from German Patent Application No. DE 102014204275.5, filed on Mar. 7, 2014, in the German Patent Office. This application is a continuation-in-part of German Patent Application No. DE 102014204275.5, the contents of which are incorporated herein by reference.

TECHNICAL FIELD

The invention relates to an arrangement for adjusting a rear view mirror for vehicles, in particular for commercial vehicles, and to a rear view mirror for such vehicles that comprises the arrangement for adjusting a rear view mirror.

BACKGROUND

Arrangements for adjusting a rear view mirror for vehicles include as a rule a first element on the vehicle side, a second element opposite the first element and a reflecting surface, such as a mirror surface. The first element on the vehicle side is fixed by a fastening arrangement, such as an extension arm or the like that is substantially immovable on the vehicle. The movable second element can be adjusted by a pivot bearing opposite the first element that pivots about an axis.

The movability or adjustability of the movable second element opposite the first element on the vehicle side requires from a structural viewpoint a slot or free space, such as an articulated slot or joining slot between elements or structural parts, that can move or be adjusted relative to each other in order to be able to ensure the required degree or degrees of freedom for the particular adjusting movements.

These articulated or joining slots can be present, for example in the case of so-called head adjusters, directly between the vehicle-side first element and the mirror head supported on it in a movable or adjustable manner. In the case of so-called glass adjusters, such a slot can be present between the vehicle-side first element and the mirror carrying plate that carries the reflecting surface (the mirror glass). In another known construction type of a head adjuster, the element that can move or be adjusted opposite the vehicle-side first element supports the mirror carrier plate. The housing of the mirror head is fixed on the mirror carrier plate and moves with it such that the housing is drawn so far to the rear that it at least partially covers the connecting position between the vehicle-side first element and the movable second element. In addition to the constructional joining slot between the vehicle-side first element and the movable second element, there is in this construction another constructionally conditioned slot or free space between the edge of the opening in the mirror housing and the engagement area between the vehicle-side element and the movable element, such as described in European patent EP2195195B1.

A rear view mirror is known from German application DE19803459A1, which has a circumferential slot between a glass unit and a housing. The glass unit has a mirror element and mirror carrier plate. The glass unit is closed by an elastically deformable damping element that dampens or prevents primarily undesired vibrational movements of the glass unit. This damping element also seals the slot against environmental influences as a side effect.

German patent DE915538B describes a similar construction principle with a circumferential slot between a glass unit and a housing. The glass unit has a mirror element and a mirror carrier plate. The glass unit is closed by an elastically deformable damping element that centers the glass unit in the housing and therefore centers an adjustment unit to the end of the housing. A sealing of the slot against environmental influences results here as a side effect in a manner similar to that of German application DE19803459A1.

In general, slots or free spaces between a glass unit or glass structural group and a housing are necessary for reasons of construction and functionality. The glass unit includes a mirror element and a mirror carrier plate, and the housing comprises the glass unit. However, the slots and free spaces can also cause problems and possible disturbances in daily operation.

Water, road salt or the like, contamination in the form of dust, ice crystals and other foreign objects can get into the slot and adversely affect or even prohibit at least temporarily the functionality of the mirror arrangement. The foreign objects can prevent a smooth adjustment of the particular elements of the mirror over the course of time. Contaminations can very rapidly adversely affects or even prevent the smooth functioning of the articulated connection or hinge connection given the very narrow articulation slots or joining slots between two articulation parts or hinge parts, which are prevented by the foreign objects from touching each other. In the case of a head adjuster, such as the one described in the above-cited European patent EP2195195B1, there is the additional problem that foreign objects enter the housing through the slot. The slot extends through the housing opening between the housing opening and the adjustment mechanism. The slot faces the travel direction of the vehicle so that wind caused by the traveling drives precipitation, stirred-up foreign bodies or the like through the slot into the interior of the mirror head housing.

The attempt is made to construct the slot between the housing opening and the adjustment mechanism on the vehicle side as narrow as possible in order to minimize the penetration of dirt and moisture. However, the problem of icing can then increase. The column freezes and closes, which can lead to problems in the adjustment movements or even to damage of the adjusting drive when the drive must operate against the additional holding force of the ice.

Therefore, a sealing element is located in the circumferential slot between the glass unit and the housing that comprises the glass unit, such as described in German application DE19803459A1 or German patent DE915538B. The sealing element is located on the circumferential outer edge of the glass unit or mirror carrier plate and cooperates with a directly adjacent counter surface that is formed by the mirror housing radially surrounding the glass unit. Therefore, a resistance to the adjusting movements of the glass unit acts through the friction of the sealing means on the counter surface of the housing and on the radially outermost edge of the glass unit. Therefore, the actual adjustment unit (whether manual or motor-driven) must overcome a comparatively high counter-moment, which necessitates in the case of a motor-driven adjustment an appropriately dimensioned drive and force transmission means.

In an arrangement of the seal in the slot between the outer edge of the glass construction group and the inner surface of the housing, such as described in German application DE19803459A1, there is furthermore the danger that the adjustment is rendered impossible by icing. This problem is even addressed in German application DE19803459A1, which suggests as a counter measure an appropriate (for example, inductive) heating device that heats the sealing means and keeps it warm. Of course, this is a structure that requires increased construction and is also more prone to disturbances.

Another problem especially in the construction, such as in the device of European patent EP2195195B1, is the fact that wind noises can be amplified by the slot, or additional whistling noises can even be produced.

Finally, such a slot also adversely affects the entire optical appearance. Considered on the whole, a slot causes the deterioration of the functional, aerodynamic and aesthetic qualities of the entire vehicle mirror.

An arrangement for adjusting a rear view mirror is sought that does not include the slot described above or the associated disadvantages.

SUMMARY

An adjustment arrangement for rear view mirrors for vehicles, in particular, commercial vehicles, includes a vehicle-side first element that can be fixed by fastening substantially immovably to the vehicle and a movable, second element that can be adjusted opposite the vehicle-side element about at least one axis. The arrangement includes the first element, the second element, a reflecting surface and a sealing means in sliding contact with the element to which it is not attached. One of the two elements includes a concave surface with the shape of a spherical shell, and the other element has a complementary convex surface shaped as a portion of a sphere. The concave and convex surfaces slide over each other during the adjustment of the mirror. The sealing means seals a joining slot between the concave and convex surfaces In one embodiment, a device for adjusting a rear view mirror includes a vehicle-side first element and a movable second element. A reflecting surface is attached to the second element. The first element has a concave surface, and the second element has a convex surface. The second element pivots about at least one axis that is fixed with respect to the first element. A joining slot is formed where the convex surface of the second element slides over the concave surface of the first element. The second element has a sealing lip that makes sliding contact with the first element and prevents foreign objects from entering the joining slot between the convex surface and the concave surface. The sealing lip annularly contacts the concave surface of the first element.

In one aspect, the sealing lip defines a housing opening in the second element and projects radially inwards towards the housing opening. The first element projects into the second element through the housing opening. The convex surface of the second element is a portion of a sphere. The concave surface is complementary to the convex surface and is formed by a portion of a spherical shell. The sealing lip makes sliding contact with a second convex surface that is disposed on the spherical shell opposite the concave surface. The sealing lip contacts the first element with an adjustable contact force.

In another embodiment, a device for adjusting a rear view mirror includes a vehicle-side first element with a concave surface and a movable second element with a convex surface. A reflecting surface is attached to the second element. A joining slot is formed where the convex surface slides over the concave surface. The second element pivots about an axis that is fixed with respect to the first element. The first element has a sealing lip that makes sliding contact with the second element and prevents foreign objects from entering the joining slot. The convex surface of the second element is a portion of a sphere, and the sealing lip makes sliding contact in an annular contact band with the convex surface. In one aspect, a mirror housing is attached to the first element and surrounds the second element.

In yet another embodiment, a device for adjusting a rear view mirror includes a vehicle-side first element with a convex surface and a movable second element with a concave surface. A reflecting surface is attached to the second element. The second element pivots about at least one axis that is fixed with respect to the first element. A joining slot is formed where the convex surface slides over the concave surface. The first element has a sealing lip that makes sliding contact with the second element and prevents foreign objects from entering the joining slot. The sealing lip annularly contacts the second element. The sealing lip contacts the second element with an adjustable contact force and is formed from a flexible, elastic material. The convex surface is a portion of a sphere. The concave surface is complementary to the convex surface and is formed by a portion of a spherical shell that is part of a mirror housing that holds the reflecting surface.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention. The same or corresponding structural parts, elements or sections are provided in all figures of the drawings with the same reference numerals and repeated descriptions of them are given only if needed.

DETAILED DESCRIPTION

Figure 1:
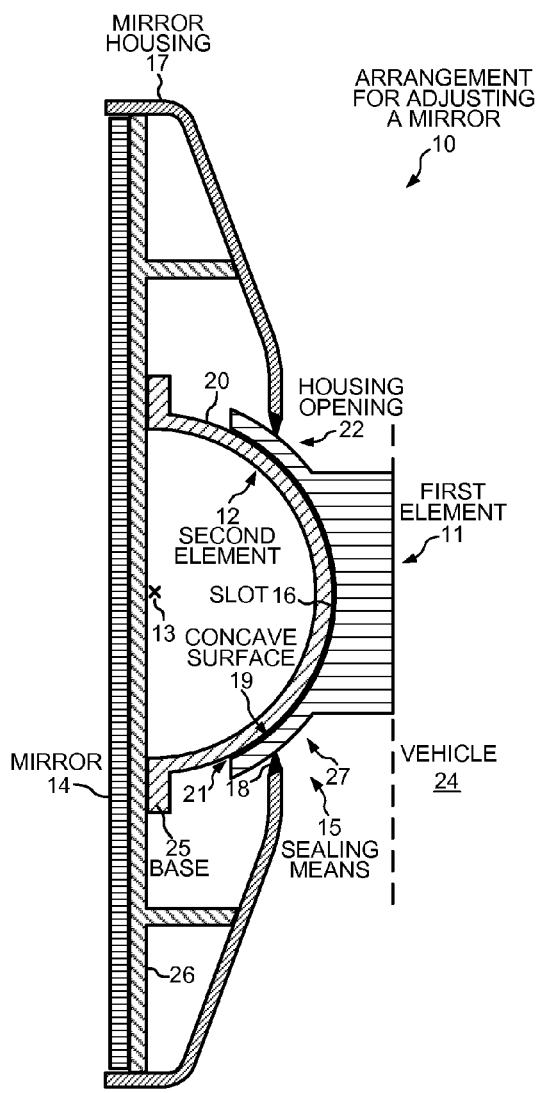
FIG. 1 schematically shows in a simplified manner a rear view mirror head with a rear view mirror adjustment arrangement in accordance with an embodiment of the present invention.

Reference will now be made in detail to some embodiments of the invention, examples of which are illustrated in the accompanying drawings.

In order to solve the problems of the prior art, the present invention presents an arrangement 10 for adjusting rear view mirrors of vehicles, in particular commercial vehicles. The mirror arrangement 10 has a vehicle-side first element 11 and a movable second element 12. The second element 12 can be adjusted by at least one pivot support located opposite the vehicle-side first element, which pivots about at least one axis 13 and which includes at least one reflecting surface 14. Furthermore, at least one of the two elements includes a sealing means 15 that has a sliding contact with a corresponding other element. The sealing means 15 seals a joining slot 16 of the pivot support against environmental influences.

The sealing means 15 is in sliding contact with one of the two elements, i.e., the vehicle-side first element 11 or the movable second element 12. The sealing means 15 establishes a reliable seal at least in some locations between the two elements. The sealing means 15 prevents in particular the penetration of dirt, moisture, saline crystals or other foreign objects so that the functionality of the adjusting arrangement 10 is not adversely affected or is only slightly affected by the foreign objects.

A significant advantage results if the sealing means 15 is located in the direct vicinity of the joining slot 16 of the articulated arrangement between the part of the mirror arrangement fixed to the vehicle and the part that can move relative to the fixed part and seals the joining slot 16 of the pivot support from environmental influences. In contrast to a seal acting between the radial outer edge of the glass construction group and the surrounding mirror housing in which the adjustment unit must overcome a comparatively high counter-moment, the counter-moment produced by the sealing means 15 is considerably less compared to an adjustment based on forces of friction. Furthermore, the danger that the adjustment becomes unnecessarily difficult or even impossible is considerably reduced.

On the one hand, if the sealing means 15 is in the direct vicinity of the joining slot 16 and the sealing means 15 itself is surrounded by a housing shell 17, a first "rough" protection is already provided by the housing shell, and a final "fine" protection of the joining slot 16 is provided from environmental influences by the actual sealing means 15 or sealing lip 18. Because this can already keep rough environmental influences from the housing shell 17, the sealing lip 18 can be designed to be correspondingly finer and therefore has a better action and also develops fewer inhibiting forces.

Finally, the sealing means 15 is located in the direct vicinity of an especially sensitive position and can optimally develop its sealing function and therefore its protective function there.

According to another preferred embodiment, one of the two elements can include at least in a partial area a concave surface 19 in particular with a shape of a spherical shell and the other element can have a convex surface 20 such that both surfaces slide over one another during the adjustment between the two elements. The sealing means 15 seals the joining slot 16 between the two surfaces.

According to the invention the sealing can be direct, i.e., the sealing means 15 closes the joining slot 16 at least partially without the interpositioning of other structural elements. It is preferred here that the sealing means 15 is arranged exclusively on one of the two elements and is located in the vicinity of the slot entrance 21 between the two surfaces of the elements, which entrance runs around in an annular fashion. This ensures that the sealing means 15 covers against the outside the critical point or the critical spot, namely, the slot opening between the two surfaces that can move relative to one another. In contrast to the above, if the sealing means 15 seals or covers the articulation slot between the two surfaces indirectly on a structural part or element that is separate from the surfaces, for example, in the area of the housing opening 22 through which the vehicle-side element 11 projects from a housing 17 associated with the movable element 12 and can move together with the latter, the sealing means 15 can act between the housing opening 22 and a section of the vehicle-side element 11 that defines the concave surface 19 that has in particular the shape of a spherical shell. The sealing means 15 indirectly protects the slot opening 21 against the outside to the greatest extent possible, but is not situated directly on the slot entrance between the elements that can move relative to one another or on partial areas of them. For more details of an indirect arrangement of the sealing means 15, see the above-cited European patent EP2195195B1.

The sealing function can be optimized in that the sealing means 15 is annularly closed substantially along the entire longitudinal extent of the annular, circumferential slot entrance 21 and extends along this entire longitudinal extent.

In one embodiment, a sealing lip 18 defines the housing opening 22 in the mirror housing 17. The sealing means 15 preferably projects from the edge of the housing opening 22 substantially radially inward in order to achieve the most reliable possible sealing action and to uniformly load the smoothness of the adjusting movement about the at least one axis 13 but also in all admissible directions.

The sealing means 15 is preferably formed by a flexible body, that is, by a body or a structural member that has a certain intrinsic elasticity. As a result, on the one hand tolerance-conditioned fluctuations of the slot size during adjusting movements can be compensated and on the other hand cakings and especially icing in the area of the sealing arrangement can be more readily broken or broken off by their flexibility during adjusting movements.

The flexible body is preferably a sealing lip 18 consisting of an elastomer or rubber or some other appropriately elastically adjusted material. In one embodiment, the sealing lip 18 is fixed by a two-component extrusion method on the particular vehicle-side or movable element or on the edge of the housing opening 22, which represents a reliable fastening of the sealing lip 18 in practice that can be readily mastered in the manufacturing process. Alternatively, the sealing lip 18 can be adhered to or otherwise fastened to the housing 17 with both even being the same substance, for example, by engaging into a groove with an undercut or the like.

In another embodiment, the sealing lip 18 has a profile like a triangle, wedge, trapezoid or is round and which has a tapered cross section. The free tip or the free end of the profile is then in a contact range or in sealing contact with the particular element against which the sealing is to take place. Therefore, in the case of an annularly closed, circular design of the sealing means 15 or of the sealing lip 18, a linear, all-around contacting of the sealing lip 18 takes place in the contact band, which on the one hand provides sufficient sealing properties and on the other hand does not excessively hinder the adjustment movements. In addition, this design of the sealing lip 18 results in a brushing-off effect during the adjusting movements, which contributes to a self-cleaning of the entire adjustment arrangement. But if the sealing lip 18 rests under excessive pressure on the contact area, the sealing lip 18 can contribute to the adjustment arrangement of the rear view mirror itself becoming jammed or the self-jamming can be brought about by the corresponding friction with the structural part.

The subject matter of the present invention can also be used in rear view mirror arrangements in which the articulated surfaces of the pivot support do not directly lie on one another with the articulated or joining slot 16 between them but rather there is a friction or sliding disk 23 present in the joining slot 16. Because the number of adjacent, slot-forming surfaces and therefore also the number of joining slots is doubled by such a disk, the subject matter of the present invention is especially useful.

The present invention is particularly applicable to the rear view mirrors of commercial vehicles, in which the rear view mirrors include view mirror adjustment arrangements such as the ones described above.

Figure 2:
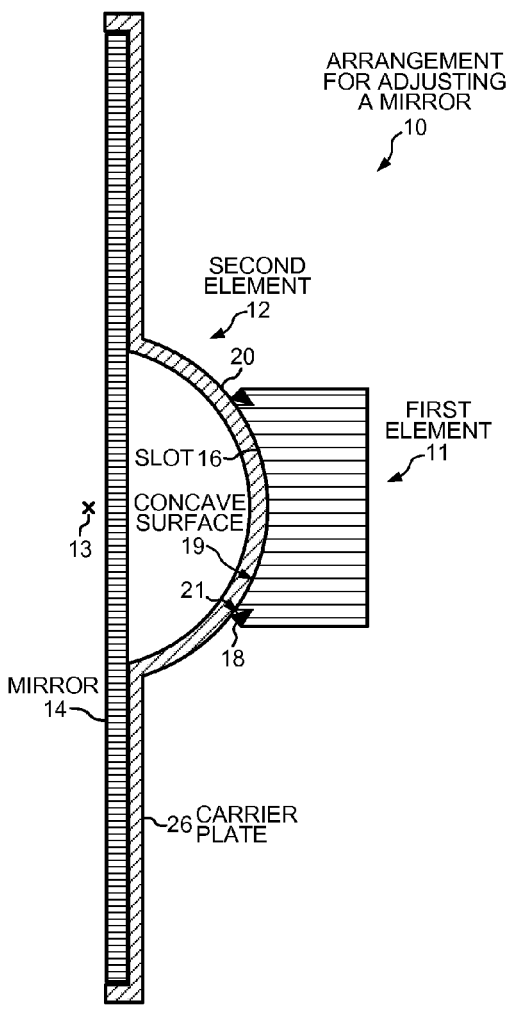
FIG. 2 shows a schematic view of another embodiment.
Figure 3:
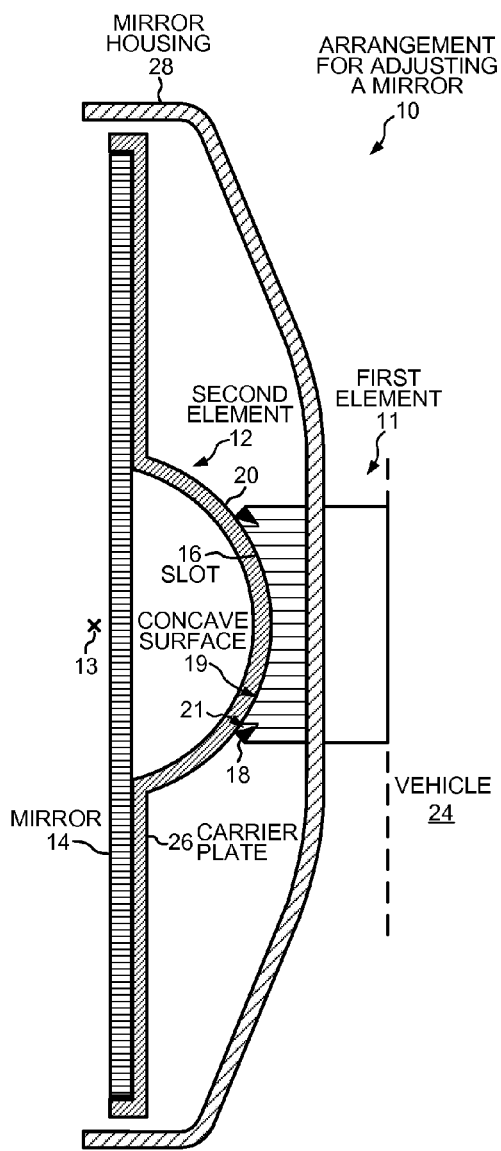
FIG. 3 shows a schematic view of another embodiment.
Figure 4:
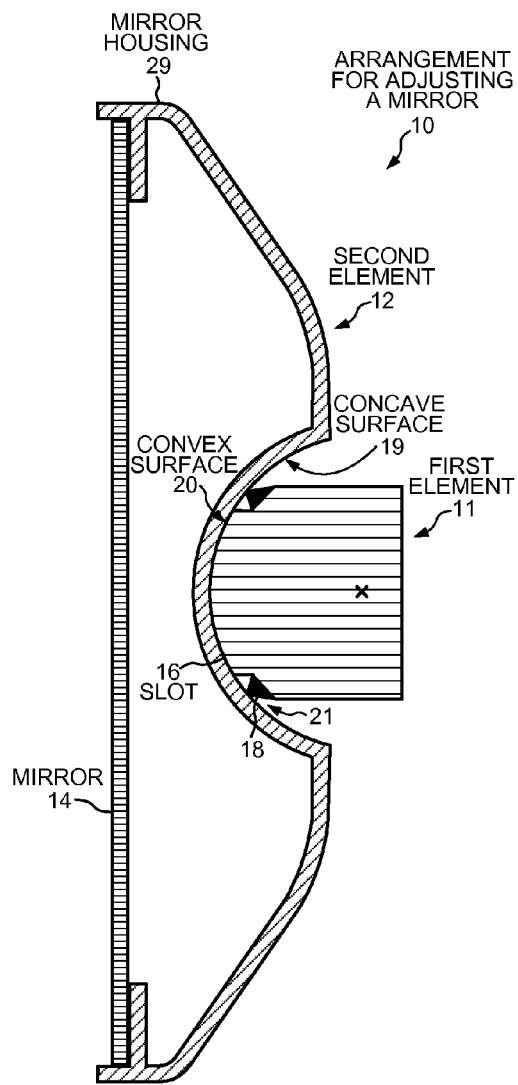
FIG. 4 shows a schematic view of another embodiment.
Figure 5:
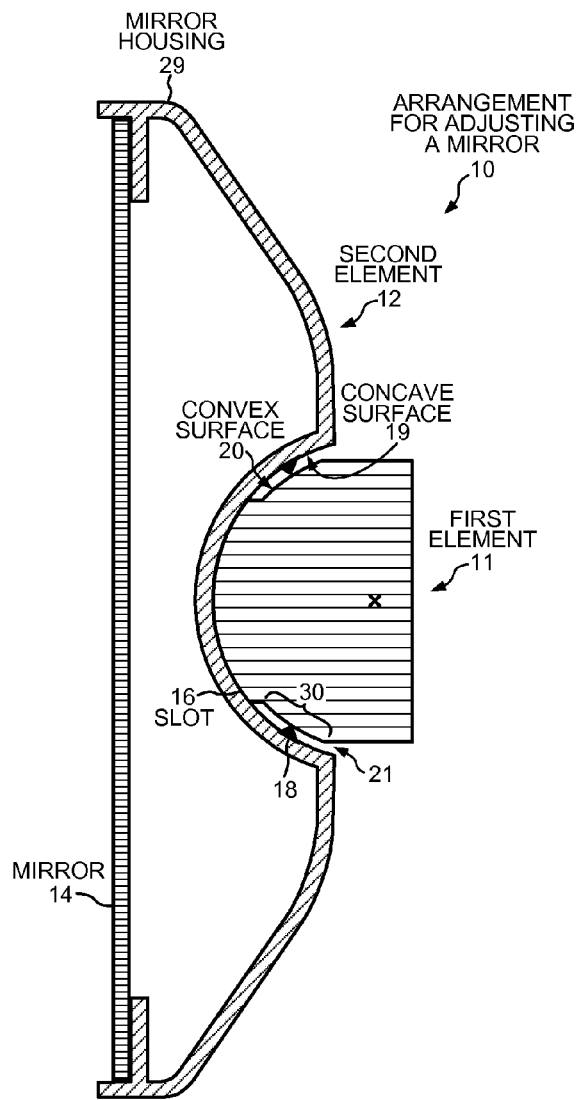
FIG. 5 shows a schematic view of a modification of the embodiment of FIG. 4.
Figure 6:
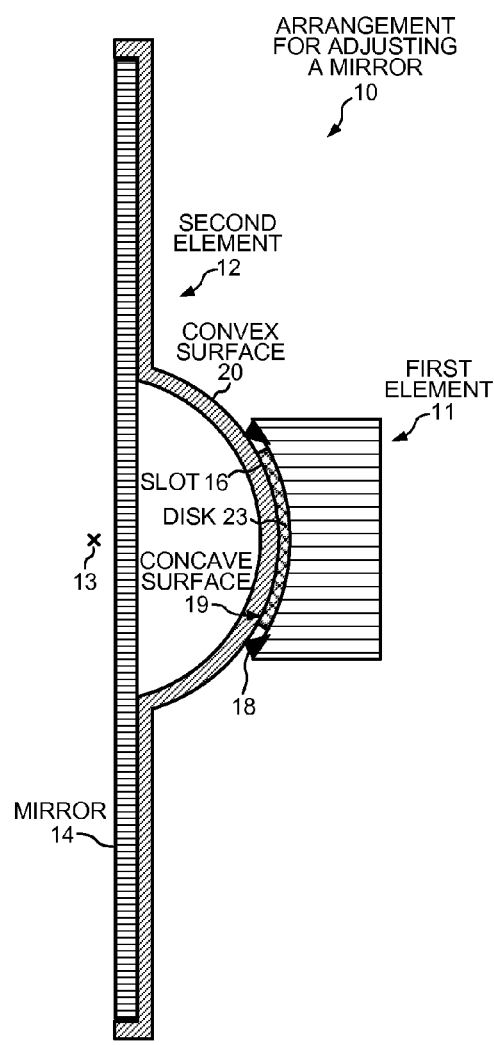
FIG. 6 shows a schematic view of a modification of the embodiment of FIG. 2.
Figure 7:
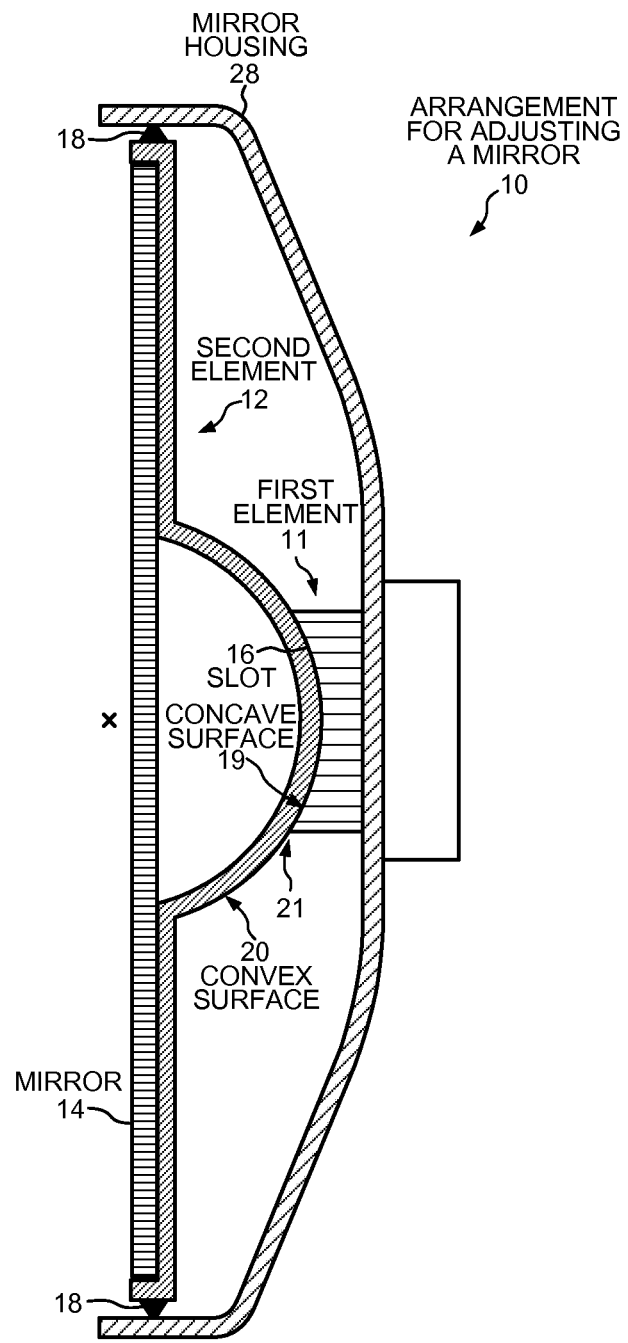
FIG. 7 shows a schematic view of a modification of the embodiment of FIG. 3.

FIGS. 1 and 4-5 show a rear view mirror with the so-called head adjuster construction, and FIGS. 2-3 show a rear view mirror with the so-called glass adjuster construction. FIGS. 4-5 differ in the position of the sealing means 18 that is attached in FIG. 4 to the immovable, vehicle-side element 11 and in FIG. 5 to the movable element 12 that moves over the vehicle-side element 11. This reversal of the insertion position of the mirror arrangement can also be carried out in the structural forms of FIGS. 2-3. FIG. 6 shows the possibility of arranging a sliding disk 23 or friction disk in the articulation or joining slot 16 of the two articulation or hinge parts that can move relative to one another. The construction design of FIG. 2 is also present in FIG. 7 and presents another option for sliding the movable element 12 over the immovable element 11. The sealing lip 18 may be placed between the movable element 12 and the mirror housing 17 as shown in FIG. 7 or directly contacting the convex surface 20 of the movable element 12 as shown in FIG. 3. It is within the subject matter of the present invention for the mirror construction and the arrangement positions of the sealing means 15 to be combined or modified in the framework of what is technically achievable and reasonable in practice.

In the exemplary embodiment of FIG. 1, the rear view mirror adjustment arrangement 10 includes a vehicle-side first element 11 and a second element 12 that can move over it. The vehicle-side first element 11 can be connected to the body of the vehicle 24 body by a fastening device not shown in detail in the drawings, for example, an extension arm or the like. The movable element 12 can be moved or adjusted about at least one axis 13 opposite the vehicle-side element 11.

The movable element 12 includes a holder or base 25 that supports a mirror carrier plate 26. A reflecting surface or mirror 14 is fastened on the free outer side of the mirror carrier plate 26. A mirror housing 17 is present on the side of the carrier plate 26 facing away from the mirror 14. The housing 17 is fastened to the mirror carrier plate 26 or is constructed with the plate in one integral part. The mirror housing 17 defines an inner space in which the movable element 12 is at least partially received.

The movable second element 12 has a convex shape such as the shape of the spherical surface shown in FIG. 1. For example, second element 12 is constructed as a semi-cylinder that can be adjusted only about one axis 13 or as a hemisphere or portion of a sphere that can be adjusted about multiple axes. The movable second element 12 defines a convex surface 20 contoured in accordance with its shape.

The vehicle-side first element 11 includes a concave section 27 shaped as a portion of a spherical shell that defines a concave surface 19 complementary to the convex surface 20. The convex surface 20 and the concave surface 19 are engaged with one another or are in guiding contact in the manner shown in FIG. 1 so that the housing 17 with the mirror 14 can carry out an adjustment movement relative to the vehicle-side element 11 about the axis 13 or about multiple axes intersecting at the center of the hemisphere.

The mirror housing 17 has a housing opening 22 between the vehicle-side element 11 and the movable element 12 so that the adjustment arrangement 10 can be positioned between the vehicle-side fastening mechanism (not shown) and the mirror carrier plate 26. In the embodiment of FIG. 1, the profile of the movable element 12 extends partially through the housing opening 22 out of the inside of the housing 17. Conversely, the concave section 27 of the vehicle-side element 11 with its concave surface 19 extends through the housing opening 22 partially into the inside of the housing 17. The sealing lip 18 makes sliding contact with a convex surface of the spherical shell of the first element 11 opposite the concave section 27.

The convex surface 20 and the concave surface 19 lie along a narrow articulation or joining slot 16 on each other. The slot 16 has a slot opening 21 constructed in the embodiment of the movable element 12 as a semi-cylinder whose center axis 13 is orthogonal to the page of FIG. 1. The movable element 12 may also be designed as a hemisphere or calotte shell in an annular, circumferential and closed manner. The narrow slot opening 21 and also the housing opening 22 are susceptible to being entered by moisture, contamination, icing and other foreign objects in the initially described manner.

In order to combat this problem, a sealing means 15 is provided that is formed in the area of the housing opening 22 in the shape of a sealing lip 18 running around the housing opening 22. The sealing lip 18 has the triangular or wedge-shaped cross section as shown in FIG. 1. The base of the triangle or wedge shape is attached to an edge of the housing opening 22 and the tip is in contact with concave section 27 of the vehicle-side element 11. Preferably, suitable elastomers, rubbery substances or the like are used as material for the sealing lip 18.

The housing opening 22 between the edge of the housing 17 and the concave section 27 of the vehicle-side element 11 is substantially closed by the sealing lip 18, and therefore even the slot opening 21 of the joining slot 16 is indirectly sealed. The sealing takes place in such a manner that the tip of the sealing lip 18 rests on the contact area in section 27 under an adjustable contact force. The contact force of the tip of the sealing lip 18 should be sufficient enough to close the housing opening 22 securely from damaging environmental influences, but it can also be adjusted higher so that a frictional restraint is achieved by the sliding contact of the tip of the sealing lip 18 on section 27. This frictional restraint can be used to support a frictional element in the slot 16 between the two surfaces 20 and 19, such as disk 23 in FIG. 6. The frictional restraint can also be used to slow the movement of the housing 17 and mirror 14 relative to the vehicle-side element 11, which preserves the selected adjustment position between the first element 11 and the second element 12.

The fastening of the sealing lip 18 in the area of the housing opening 22 of the mirror housing 17 can be achieved by gluing or adhering the sealing lip 18 to the edge of the housing 17. Alternatively, mechanical means in the form of a groove with an undercut in the area of the housing opening 22 on the inside of the mirror housing 17 can be provided with a corresponding counter-profile on the sealing lip 18 that engages with the groove. Another way of fastening the sealing lip 18 to the edge of the housing 17 is to form the lip using a two-component injection method during the manufacturing of the mirror housing 17.

FIG. 1 shows that the sealing lip 18 of the sealing means 15 is capable of closing the opening between the edge of the housing opening 22 and the outer side of the vehicle-side element 11 in the area of section 27. The entrance of moisture, rainwater, dirt, salt crystals, etc., which is possibly assisted by the wind of driving, into the interior of the mirror housing 17 and therefore possibly via the slot opening 21 also into the slot 16 is therefore avoided. Even other components or structural parts belonging to the equipment of the entire rear view mirror and present in the interior of the mirror housing 17 are much better protected from such influences.

FIG. 2 shows another embodiment that is used in a so-called glass adjuster. Here, the adjusting arrangement 10 again includes the vehicle-side first element 11 and the second element 12 that moves in the first element 11. The second element 12 is directly connected to the mirror carrier plate 26 and includes the mirror 14 which is held by the mirror carrier plate 26. The movable element 12 is convex and is constructed with a convex surface 20 analogously to the manner described in FIG. 1. The articulated or joining slot 16 is formed between the convex surface 20 in guiding contact with the complementary concave surface 19 of the vehicle-side element 11. The sealing means 15 with the sealing lip 18 is constructed in the immediate vicinity of the slot opening 21 on the vehicle-side element 11. The position and arrangement of the sealing lip 18 is such that the slot opening 21 of the slot 16 is reliably covered from the outside by the sealing lip 18 and is therefore protected.

FIG. 3 shows another embodiment that is a modification of the embodiment of FIG. 2 in that a modified mirror housing 28 is added to the embodiment of FIG. 2. The housing 28 is attached to the area of the vehicle-side element 11 and surrounds and/or encloses the adjustment arrangement 10 together with the structural elements as well as the mirror carrier plate 26 and the mirror 14 and defines an inner space in which other components of the rear view mirror can be housed. Sealing lip 18 protects the articulation or joining slot 16 between the two surfaces 19 and 20 from moisture, contamination and other foreign objects.

FIG. 4 shows an embodiment in a head-adjuster design in which a mirror housing 29 without a mirror carrier plate directly carries the mirror 14 or reflecting surface. The housing 29 includes a concave recess that defines the concave surface 19. The vehicle-side element 11 includes a complementary convex surface 20 that rests on the concave surface 19 and forms the joining slot 16. The slot opening 21 is closed by the sealing lip 18 that is positioned at the side of the vehicle-side element 11.

FIG. 5 shows a modification of the embodiment of FIG. 4 in which the sealing lip 18 is positioned on the sides of the mirror housing 29 on the concave surface 19 and presses with its tip against the surface of a receding section 30. The receding section 30 is opposite the convex surface 19 and runs parallel or co-axially to surface 19 and corresponds in its extent and alignment to the maximal adjustment path of the housing 29 opposite the vehicle-side element 11. So that the movement of the housing 29 can be adjusted, the two surfaces 20 and 19 are in guiding contact, rest on one another and form the joining slot 16 between them where the receding section 30 is not formed. In the receding section 30, the sealing lip 18 ensures that moisture, contaminants or the like cannot pass into the slot 16 between the two surfaces 19 and 20. As shown in FIG. 5, the sealing lip 18 is attached to the side of the mirror housing 29 and presses against the contact area on the side of the first element 11. Alternatively, the sealing lip 18 is attached to the side of the first element 11 and rubs against the mirror housing 29 and the contact area there. The constructive reversal concerning the position of the sealing means 15 and of the sealing lip 18 shown in FIGS. 4-5 can generally also be used in the embodiments of FIGS. 2-3. Even there the sealing lip 18 can be provided on the movable section 12 and can act against the vehicle-side element 11.

FIG. 6 shows an embodiment that is a variant of the embodiment of FIG. 2. The same reference numerals designate the same elements, and a redundant description will not be given. In the embodiment of FIG. 6, a disk 23 lies at least in a partial section of the joining slot 16. As a result of this disk, the articulated surfaces of the pivot support do not lie directly on one another with the joining slot 16 between them. The disk 23 can be a sliding disk that reduces friction in the slot 16 or the disk 23 can be a friction disk that makes the movement more difficult in the slot 16 either throughout or in discrete steps (rastering). The number of adjacent, slot-forming surfaces and therefore also the number of joining slots is doubled by the disk 23, so that the harm from disturbances due to environmental influences, foreign bodies, etc. is even increased. Therefore, to this extent the subject matter of the present invention is especially useful because the sealing lip 18 prevents any penetration of water, dust, etc.

FIG. 7 shows an embodiment that is a variant of the embodiment of FIG. 3. The same reference numerals again designate the same elements, and a redundant description will not be given. In FIG. 7 the mirror disk in the manner of a so-called glass adjuster (optionally together with the carrier plate 26) is received in the mirror housing 28. As distinguished from FIG. 3, the sealing means 15 and sealing lip 18 are located between the outer circumferential edge of the mirror disk 14 and/or carrier plate 26 and the inner surface of the mirror housing 28. The inner surface lies opposite the circumferential edge in the area of the opening of the mirror housing 28. Although there is no sealing means in the area of the joining slot 16, such an additional sealing means or sealing lip can be provided analogously to the design of FIG. 3. The additional sealing lip would then directly protect the area of the joining slot 16, in contrast to the sealing lip 18 shown in FIG. 7 which primarily protects the inner space of the mirror housing 28.

Essential advantages of the subject matter of the invention can be summarized as follows. If the sealing means 15 is located in the direct vicinity of the joining slot 16 of the articulating means or of the pivot support between the part of the mirror adjustment arrangement fixed to the vehicle and the part that can move relative to it and seals the joining slot 16 of the pivot support against environmental influences, then the significant advantage results that the counter-moment produced by the sealing means 15 is considerably less compared to an adjustment based on forces of friction. As a result of the sealing means 15, there is a much lower contamination of the individual components or elements of the adjustment arrangement 10. In particular, any frictional elements or friction surfaces between the two elements 11 and 12 are protected from contamination and therefore from premature wear. The aerodynamic properties of the adjustment arrangement 10 are improved because slots that can produce vortexes or whistling noises are closed by the sealing means 15.

Because the slot dimensions can be significantly reduced and/or the slots can be completely closed, a higher optical value of the entire rear view mirror results. Another significant advantage is the fact that incident light from the outside coming into the interior of the housing 17, 28 or 29 can be avoided by the sealing arrangement 28. Such incident light is undesired in the case of certain optical or optoelectronic equipment of the rear view mirror, the mirror surface used, or the reflected surface. As a result of the improved aerodynamics of the entire mirror, namely that vortexes are present, even adjacent body parts of the vehicle can be better protected from contamination.

Subject matter of the present invention is not limited to the concretely shown and described embodiments. For example, the shape of the sealing lip 18 can differ from the triangular or wedge-shaped profile shown. Furthermore, two or even three individual sealing lips 18 can be connected in parallel adjacent to each other or in series. An individual sealing lip 18 can be used just as well that includes a plurality of triangular or wedge-shaped projections.

Instead of or additionally to the reflected surface (mirror 14), the rear view mirror can also comprise one or more cameras or other structural parts that take images or are photosensitive and/or that emit light in the interior of the housing 17, 28, or 29, that are then located behind a glass disk instead of the mirror disk or that operate through a partially translucent mirror disk. In rear view mirrors equipped in this manner, the protection of the interior of the mirror housing that is ensured by the sealing means 15 is especially necessary. Several sealing means can also be provided on a single rear view mirror. Therefore, for example, the structural shape or sealing means of FIG. 3 can be combined with the one of FIG. 7.

By way of summation, an adjustment arrangement for rear view mirrors for vehicles, in particular commercial vehicles, with a vehicle-side first element that can be fixed by a fastening arrangement substantially immovably on the vehicle and with a movable second element that can be adjusted opposite the vehicle-side element about at least one axis and that includes a reflecting surface is disclosed. At least one of the two elements includes a sealing means 15 that has a sliding contact with the corresponding other element. One of the two elements can include a concave surface in particular with the shape of a spherical shell and the other element can have a complementary convex surface, in particular with a shape of a spherical shell at least in a partial area. Both surfaces slide over one another during the adjustment. The sealing means 15 directly seals a slot between the two surfaces. Furthermore, the present invention also has as subject matter a rear view mirror for vehicles with at least one such rear view mirror adjustment arrangement.

LIST OF REFERENCE NUMERALS

10 adjustment arrangement
11 vehicle-side first element
12 movable second element
13 axis
14 mirror
15 sealing means
16 joining slot
17 mirror housing
18 sealing lip
19 concave surface
20 convex surface
21 joining slot opening
22 housing opening
23 sliding disk
24 vehicle
25 base
26 carrier plate
27 concave section of 11
28 mirror housing
29 mirror housing
30 receding section Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A device for adjusting a rear view mirror, comprising:
a vehicle-side first element with a concave surface; and
a movable second element with a convex surface, wherein a joining slot is formed where the convex surface slides over the concave surface, wherein the second element pivots about at least one axis that is fixed with respect to the first element, wherein a reflecting surface is attached to the second element, wherein the second element has a sealing lip that makes sliding contact with the first element, and wherein the second element includes a housing with a housing opening and an inner space, wherein the sealing lip is attached around an edge of the housing opening, and wherein all of the convex surface remains inside the inner space as the sealing lip slides along the first element.

2. The device of claim 1, wherein the sealing lip annularly contacts the first element.

3. The device of claim 1, wherein a partial area of the first element forms a portion of a spherical shell with the concave surface inside the spherical shell, wherein the spherical shell has a second convex surface opposite the concave surface, and wherein the sealing lip makes sliding contact with the second convex surface.

4. The device of claim 1, wherein the convex surface is a portion of a sphere, wherein the concave surface is complementary to the convex surface and is formed by a portion of a spherical shell, wherein a second convex surface is disposed on the spherical shell opposite the concave surface, and wherein the sealing lip makes sliding contact with the second convex surface.

5. The device of claim 1, wherein the sealing lip defines the housing opening in the second element, and wherein the sealing lip projects substantially radially inwards towards the housing opening.

6. The device of claim 1, wherein the sealing lip and the housing are formed together in a two-component extrusion method such that the sealing lip defines the housing opening and projects substantially radially inwards towards the housing opening.

7. The device of claim 1, wherein the first element projects into the second element through the housing opening.

8. The device of claim 1, wherein the sealing lip is formed from a flexible, elastic material.

9. The device of claim 1, wherein the housing opening is circular, and wherein the sealing lip projects radially inward from the edge of the housing opening.

10. The device of claim 1, wherein the sealing lip has a tapered cross section with a free tip opposite the edge, and wherein only the free tip makes sliding contact with the first element.

11. The device of claim 1, wherein sealing lip contacts the first element with an adjustable contact force.

12. A device for adjusting a rear view mirror, comprising:
a vehicle-side first element with a concave surface; and
a movable second element with a convex surface, wherein a joining slot is formed where the convex surface slides over the concave surface, wherein the second element pivots about at least one axis that is fixed with respect to the first element, wherein a reflecting surface is attached to the second element, wherein the first element has a sealing lip that makes sliding contact with the second element, wherein an inner space is formed between the housing and the second element, and wherein all of the convex surface remains inside the inner space as the sealing lip slides along the convex surface of the second element, and wherein the sealing lip prevents foreign objects from entering the joining slot.

13. The device of claim 12, wherein the sealing lip annularly contacts the second element.

14. The device of claim 12, wherein the convex surface is a portion of a sphere, and wherein the sealing lip makes sliding contact in an annular contact band with the convex surface.

15. The device of claim 12, further comprising:
a mirror housing attached to the first element, wherein the mirror housing surrounds the second element.

16. A device for adjusting a rear view mirror, comprising:
a vehicle-side first element with a convex surface; and
a movable second element with a concave surface, wherein a joining slot is formed where the convex surface slides over the concave surface, wherein the second element pivots about at least one axis that is fixed with respect to the first element, wherein a reflecting surface is attached to the second element, wherein the second element has a sealing lip disposed between the concave surface and the convex surface that makes sliding contact with the first element, wherein the sealing lip is formed from a flexible, elastic material, and wherein the sealing lip prevents foreign objects from entering the joining slot.

17. The device of claim 16, wherein the sealing lip annularly contacts the second element.

18. The device of claim 16, wherein the convex surface is a portion of a sphere, wherein the concave surface is complementary to the convex surface and is formed by a portion of a spherical shell, and wherein the portion of the spherical shell is part of a mirror housing that holds the reflecting surface.

19. The device of claim 16, wherein the sealing lip has a tapered cross section with a free tip, and wherein only the free tip makes sliding contact with the first element.

20. The device of claim 16, wherein sealing lip contacts the second element with an adjustable contact force.

* * * * *